US012570811B2

(12) United States Patent
Kaji et al.

(10) Patent No.: US 12,570,811 B2
(45) Date of Patent: Mar. 10, 2026

(54) METHOD FOR PRODUCING FIBER-REINFORCED RESIN ARTICLE, AND FIBER-REINFORCED RESIN ARTICLE

(71) Applicant: Mitsubishi Chemical Corporation, Tokyo (JP)

(72) Inventors: Satoshi Kaji, Tokyo (JP); Tsuneo Takano, Tokyo (JP); Takashi Honma, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 175 days.

(21) Appl. No.: 18/369,968

(22) Filed: Sep. 19, 2023

(65) Prior Publication Data

US 2024/0002613 A1     Jan. 4, 2024

Related U.S. Application Data

(63) Continuation of application No. PCT/JP2022/012737, filed on Mar. 18, 2022.

(30) Foreign Application Priority Data

Mar. 22, 2021     (WO) .................. PCT/JP2021/011690
Apr. 15, 2021     (JP) ................................ 2021-069189

(51) Int. Cl.
    *B29C 33/52*          (2006.01)
    *B29C 70/46*          (2006.01)
    (Continued)

(52) U.S. Cl.
    CPC ............. *C08J 5/048* (2013.01); *B29C 70/465* (2013.01); *C08J 5/24* (2013.01)

(58) Field of Classification Search
    CPC ....... B29C 70/86; B29C 70/80; B29C 70/462; B29C 2043/182; B29C 2043/181;
    (Continued)

(56) References Cited

U.S. PATENT DOCUMENTS 1,394,553 A * 10/1921 Hoffer ................... B29C 33/123
                                                                 428/21
3,068,007 A * 12/1962 Satchell .............. B29C 33/0011
                                                                 264/129
(Continued)

FOREIGN PATENT DOCUMENTS

CN         105358315 A      2/2016
CN         105946247 A      9/2016
(Continued)

OTHER PUBLICATIONS

Extended European Search Report issued Aug. 17, 2023 in Patent Application No. 21776538.7, 7 pages.
(Continued)

*Primary Examiner* — Matthew J Daniels
(74) *Attorney, Agent, or Firm* — Element IP, PLC

(57)     ABSTRACT

The present invention provides a beneficial improvement relating to a method for producing a fiber-reinforced resin article at least partially having a hollow structure part. A method for a producing fiber-reinforced resin article according to the present invention includes a molding step of disposing, in a press mold, a prepreg preform including a core-containing part in which a fusible core comprising a wax material is disposed in an inner side, and heating the disposed prepreg preform to obtain a cured product having a hollow structure part and a core removal step of removing the fusible core from the cured product. In the prepreg preform, a through hole is formed in the core-containing part, and an elastomer stopper is inserted into the through hole.

33 Claims, 6 Drawing Sheets

(51) Int. Cl.
     *B29C 70/70*     (2006.01)
     *C08J 5/04*      (2006.01)
     *C08J 5/24*      (2006.01)
(58) Field of Classification Search
     CPC ....... B29C 33/54; B29C 33/52; B29C 33/448;
                                          B29C 70/543
     See application file for complete search history.

(56)                  References Cited

U.S. PATENT DOCUMENTS

| | | | | |
|---|---|---|---|---|
| 3,284,556 | A | * | 11/1966 | Hay ......................... B29C 33/52 |
| | | | | 264/250 |
| 3,424,226 | A | * | 1/1969 | Steele ....................... B22C 9/04 |
| | | | | 164/28 |
| 3,642,975 | A | * | 2/1972 | Duggins ................. B29C 51/28 |
| | | | | 249/82 |
| 4,499,148 | A | * | 2/1985 | Goodale ................. B29C 65/08 |
| | | | | 156/275.5 |
| 4,581,190 | A | * | 4/1986 | Nagamoto ............. A63B 60/00 |
| | | | | 264/137 |
| 4,615,855 | A | * | 10/1986 | Orlowski .............. B29C 70/446 |
| | | | | 264/225 |
| 4,811,778 | A | * | 3/1989 | Allen ........................ B22C 9/04 |
| | | | | 164/397 |
| 4,874,570 | A | * | 10/1989 | Haines ................... A63B 60/00 |
| | | | | 264/156 |
| 5,089,186 | A | * | 2/1992 | Moore .................... B22C 1/167 |
| | | | | 164/36 |
| 5,096,243 | A | | 3/1992 | Gembinski |
| 5,176,864 | A | * | 1/1993 | Bates ...................... B29C 33/52 |
| | | | | 264/137 |
| 5,415,373 | A | | 5/1995 | Brummer |
| 5,614,143 | A | * | 3/1997 | Hager .................... A63B 60/00 |
| | | | | 473/324 |
| 5,795,524 | A | * | 8/1998 | Basso, Jr. ............... B29C 33/52 |
| | | | | 156/173 |
| 7,670,532 | B1 | * | 3/2010 | Weaver ................... B29C 70/32 |
| | | | | 156/173 |
| 2002/0038923 | A1 | * | 4/2002 | Lenherr .................. B29C 70/48 |
| | | | | 425/86 |
| 2004/0131720 | A1 | * | 7/2004 | Hsu ......................... B29C 33/44 |
| | | | | 425/408 |
| 2007/0190273 | A1 | * | 8/2007 | Hamaguchi ........... B29C 33/304 |
| | | | | 428/34.4 |

| | | | | |
|---|---|---|---|---|
| 2013/0011269 | A1 | * | 1/2013 | Gainnozzi .......... B29D 99/0028 |
| | | | | 416/223 R |
| 2019/0270225 | A1 | * | 9/2019 | Takano ................... B29C 43/04 |
| 2021/0299982 | A1 | * | 9/2021 | Hatta ...................... B29C 45/38 |
| 2021/0308967 | A1 | * | 10/2021 | Thai ...................... B29C 33/405 |

FOREIGN PATENT DOCUMENTS

| | | | |
|---|---|---|---|
| CN | 107031072 | A | 8/2017 |
| CN | 109890587 | A | 6/2019 |
| EP | 3533580 | A1 | 9/2019 |
| EP | 3892435 | A1 | 10/2021 |
| EP | 3936320 | A1 | 1/2022 |
| GB | 2146572 | A | 4/1985 |
| JP | H05116233 | A | 5/1993 |
| JP | 2004017412 | A | 1/2004 |
| JP | 2007307853 | A | 11/2007 |
| JP | 2011067191 | A | 4/2011 |
| JP | 2019188707 | A | 10/2019 |
| JP | 2020032535 | A | 3/2020 |
| WO | WO-2018079824 | A1 | 5/2018 |
| WO | WO-2020184163 | A1 | 9/2020 |

OTHER PUBLICATIONS

International Search Report issued Apr. 5, 2022 in PCT/JP2022/012737 (with English translation), 4 pages.
International Search Report issued May 11, 2021 in PCT/JP2021/011690 (with English translation), 5 pages.
Extended European Search Report issued Jul. 19, 2024 in corresponding European Patent Application No. 22775477.7, 7 pages.
Combined Chinese Office Action and Search Report issued Feb. 21, 2025, in corresponding Chinese Patent Application No. 202180022774.2 (with machine English translation), 75 pages.
Guoqun Zhao, "Rapid Heat Cycle Injection Molding Technology", China Machine Press, Sep. 30, 2014, pp. 36-37 (with machine English translation).
Office Action issued Nov. 28, 2023 in corresponding Japanese Patent Application No. 2023-005007 (with machine English translation), 6 pages.
Combined Chinese Office Action and Search Report issued Nov. 27, 2025, in corresponding Chinese Patent Application No. 202280022183.X (with machine English translation), 12 pages.
Office Action issued Jan. 6, 2026, in corresponding Japanese Patent Application No. 2023-509140 (with machine English translation), 8 pages.

* cited by examiner

METHOD FOR PRODUCING FIBER-REINFORCED RESIN ARTICLE, AND FIBER-REINFORCED RESIN ARTICLE

The present application is a continuation application of International Application No. PCT/JP2022/012737, filed on Mar. 18, 2022, which claims priority of PCT/JP2021/011690 filed on Mar. 22, 2021 under the Patent Cooperation Treaty, and Japanese Patent Application No. 2021-069189 filed on Apr. 15, 2021, the contents of which are incorporated herein by reference.

TECHNICAL FIELD

The present invention mainly relates to a method for producing a fiber-reinforced resin article, and a fiber-reinforced resin article.

BACKGROUND ART

Fiber-reinforced plastic (FRP) is used in various use applications including a reinforcement for automobiles.

A method, in which a prepreg preform is heated and cured in a press mold together with a core comprising a wax material to produce a fiber-reinforced resin article having a hollow structure part, is proposed (Patent Document 1).

CITATION LIST

Patent Document

[Patent Document 1]
PCT International Publication No. WO2018/079824

SUMMARY OF INVENTION

Technical Problem

An object of the present invention is to provide a beneficial improvement relating to a method, in which a prepreg preform is heated and cured in a press mold together with a core comprising a wax material to produce a fiber-reinforced resin article at least partially having a hollow structure part.

The object of the present invention includes providing a technique useful for preventing a hollow structure part from expanding and deforming after molding has been completed and a press mold has been opened.

The object achieved by each embodiment according to the present invention may be disclosed explicitly or implicitly in the present specification.

Solution to Problem

In one aspect according to the present invention, there is provided a method for producing a fiber-reinforced plastic, the production method comprising:
  a molding step of disposing, in a press mold, a prepreg preform including a core-containing part in which a fusible core comprising a wax material is disposed in an inner side, and heating the disposed prepreg preform to obtain a cured product having a hollow structure part; and
  a core removal step of removing the fusible core from the cured product,
  wherein in the prepreg preform, a through hole is formed in the core-containing part, and an elastomer stopper is inserted into the through hole.

In another aspect according to the present invention, there is provided a method for producing a fiber-reinforced plastic, the production method comprising:
  a molding step of disposing, in a press mold, a prepreg preform including a core-containing part in which a fusible core comprising a wax material is disposed in an inner side, and heating the disposed prepreg preform to obtain a cured product having a hollow structure part; and
  a core removal step of removing the fusible core from the cured product,
  wherein in the core-containing part, a first through hole and a second through hole are formed in the prepreg preform, a first elastomer stopper is inserted into the first through hole, and a second elastomer stopper is inserted into the second through hole.

In still another aspect according to the present invention, there is provided a fiber-reinforced resin article comprising:
  a hollow structure part;
  a cavity formed in the hollow structure part;
  a through hole that leads to an outside from an inner space of the cavity; and
  an elastomer stopper that closes the through hole.

Effects of Invention

There is provided a beneficial improvement relating to a method, in which a prepreg preform is disposed and cured in a press metal mold together with a core comprising a wax material to produce a fiber-reinforced resin article at least partially having a hollow structure part.

DESCRIPTION OF EMBODIMENTS

1. Method for Producing Fiber-Reinforced Resin Article

One of the embodiments according to the present invention relates to a method for producing a fiber-reinforced resin article (hereinafter, also referred to as an FRP article).

Figure 1:
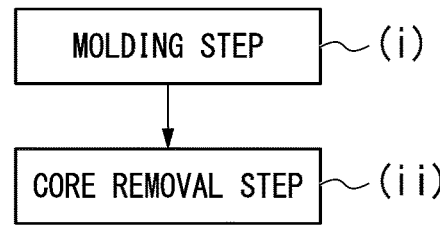
FIG. 1 is a flowchart of a method for producing a fiber-reinforced resin article according to an embodiment.

The method for producing an FRP article according to the embodiment comprises the following two steps as shown in FIG. 1.

(i) A molding step of disposing, in a press metal mold, a prepreg preform including a core-containing part in which a fusible core comprising a wax material is disposed in an inner side, and heating the disposed prepreg preform to obtain a cured product having a hollow structure part.

(ii) A core removal step of removing the fusible core from the cured product.

Hereinafter, the method for producing an FRP article according to the embodiment will be described in detail with reference to the drawings.

1. 1. Molding Step

The molding step is a step of disposing, in a press metal mold, a prepreg preform including a core-containing part in which a fusible core comprising a wax material is disposed in an inner side, and heating the disposed prepreg preform to obtain a cured product.
(Prepreg Preform)

The prepreg preform is prepared in advance outside the press mold using a prepreg such as a prepreg sheet or a tow prepreg as a main material so that the prepreg preform has a near net shape.

When a prepreg sheet is used, two or more prepreg sheets may be laminated in a part or whole of the prepreg preform. A portion in which a plurality of prepreg sheets are laminated may include two or more sheets of the same kind of prepreg sheets, may include two or more kinds of prepreg sheets different from each other, or may include both.

A prepreg preform in which a prepreg sheet is used may have a portion reinforced with a tow prepreg.

A part or whole of the prepreg preform may be formed of only a tow prepreg.

Various fiber-reinforcing materials such as continuous fibers, chopped fibers, woven fabrics, nonwoven fabrics, and non-crimp fabrics are used for prepregs.

A prepreg sheet having a plurality of continuous fiber bundles aligned in parallel as a fiber-reinforcing material is called a unidirectional prepreg (UD prepreg).

A prepreg sheet using a woven fabric comprising continuous fiber bundles as a fiber-reinforcing material is called a cloth prepreg.

A prepreg sheet using a mat formed by depositing chopped fiber bundles as a fiber-reinforcing material is called a sheet molding compound (SMC).

A tow prepreg is a prepreg that uses a single continuous fiber bundle as a reinforcing material.

Examples of the fiber that is used in the fiber-reinforcing material include a carbon fiber, a glass fiber, an aramid fiber, a silicon carbide fiber, and a metal fiber. Two or more kinds of fibers may be used in combination.

Examples of the thermosetting resin that is used for a prepreg include an epoxy resin, a urea resin, a vinyl ester resin (also called an epoxy acrylate resin), unsaturated polyester, polyurethane, and a phenol resin. Two or more kinds of thermosetting resins may be mixed together and used.

The amount of the thermosetting resin composition in the prepreg is not limited; however, it is, for example, 15% to 60% by mass. The amount thereof may be 15% to 20% by mass, 20% to 25% by mass, 25% to 40% by mass, 40% to 50% by mass, 50% to 60% by mass, or the like.

Various additives can be added to the thermosetting resin composition. Examples thereof include a reactive diluent, a flame retardant, an antifoaming agent, a defoaming agent, a mold release agent, a particulate filler, a coloring agent, and a silane coupling agent.

The prepreg preform is prepared to be in a state where a fusible core is disposed at a position corresponding to a cavity that is formed in the hollow structure part of the FRP article to be produced. In other words, a prepreg preform, in which a core-containing part in which a fusible core is disposed in the inner side is provided in a portion that becomes the hollow structure part after curing, is prepared.

For example, when producing a square columnar hollow FRP article 1 shown in FIG. 2 and FIG. 3, in which an upper surface and a lower surface are square and four side surfaces are rectangular, a prepreg preform is prepared by a procedure described below.

Figure 4:
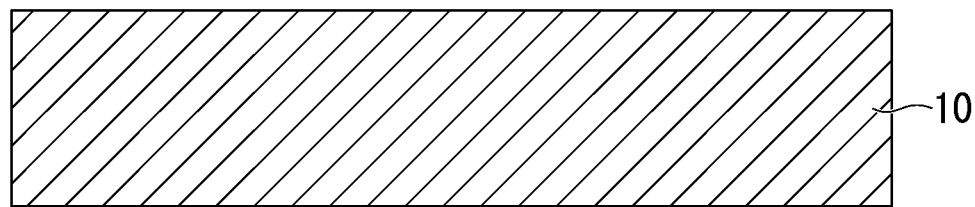
FIG. 4 is a cross-sectional view of a fusible core.

First, as shown in FIG. 4, a fusible core 10 having substantially the same shape and dimension as the cavity included in the inside of the FRP article 1 is prepared.

The fusible core is formed of a wax material so that the entire fusible core can be fused and removed in the core removal step that is carried out after the molding step. The details of the wax material will be described later.

Figure 5:
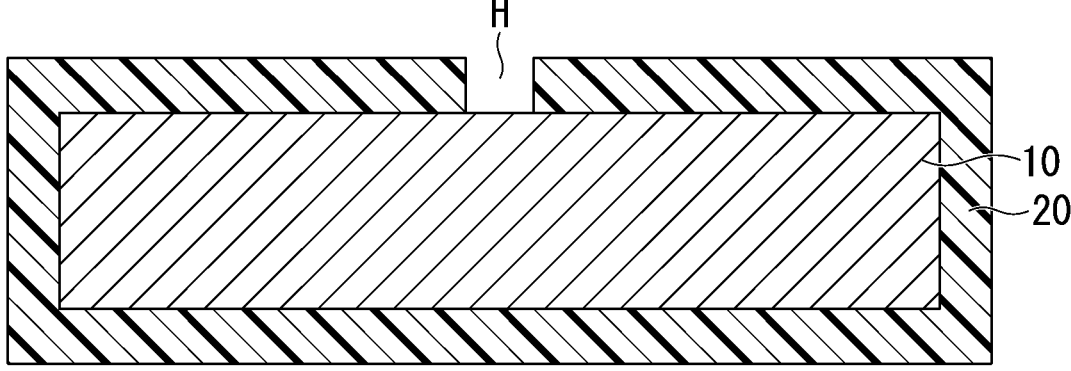
FIG. 5 is a cross-sectional view of a prepreg preform that is prepared such that a core is disposed inside.

Next, as shown in FIG. 5, the prepreg sheet is disposed around the fusible core 10, whereby a prepreg preform 20 having a near net shape is formed. In this example, the entire prepreg preform 20 corresponds to the core-containing part.

When the prepreg preform 20 is prepared, a through hole H preferably having an inner diameter of 10 mm or less is formed in advance in a part of the prepreg sheet to be used as a material.

Figure 6:
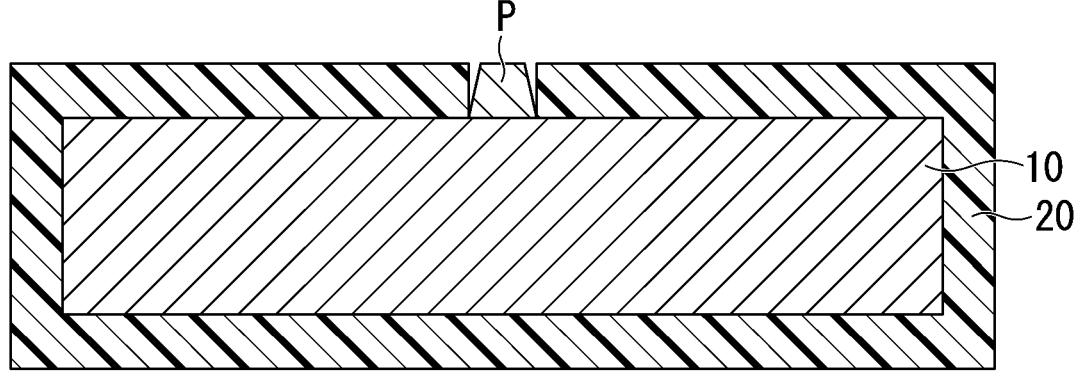
FIG. 6 is a cross-sectional view showing a state where an elastomer stopper is inserted into a through hole, in the prepreg preform that is prepared such that a core is disposed inside.

Finally, as shown in FIG. 6, an elastomer stopper P is inserted from the outside into the through hole H formed in the prepreg sheet.

A gap may remain between the through hole H and the elastomer stopper P. Such a gap is closed by the flow deformation of the prepreg sheet when the prepreg preform 20 is cured.

The elastomer stopper P is tapered in a direction opposite to the direction of insertion into the through hole H. That is, a side of the elastomer stopper P, which is larger in terms of an area of a cross section orthogonal to an insertion direction, is inserted into the through hole H to be directed toward the fusible core 10. The reason for this is to prevent the elastomer stopper P from being removed due to the pressure inside the cavity after the molding step and before the wax is discharged.

In an example, in order to prevent the elastomer stopper from being removed after the molding step, a protrusion or a depression may be provided on a side surface of the elastomer stopper in addition to or instead of tapering the elastomer stopper as described above.

The material of the elastomer stopper is not limited; however, examples thereof include acrylic rubber, fluoro-rubber, silicone rubber, nitrile rubber, and butyl rubber.

(Curing)

In the present specification, the temperature of the press mold when curing a prepreg preform is referred to as a molding temperature.

The molding temperature may be any temperature at which the prepreg preform can be cured in preferably 1 hour or less, more preferably 40 minutes or less, and still more preferably 20 minutes or less.

The molding temperature is, for example, 100° C. or higher, it may be 120° C. or higher and further, 130° C. or higher. As the molding temperature is higher, the time required for curing the prepreg preform is shortened.

In a case where the molding temperature exceeds 160° C., the range of choice of wax materials is narrowed. From the viewpoint of shortening the time required for heating the press mold and reducing energy consumption, the molding temperature can be set to 150° C. or lower and further, 140° C. or lower.

Before the prepreg preform is put, the temperature of the press mold is held at the molding temperature, by a temperature control mechanism that is usually provided in a press molding machine.

Figure 7:
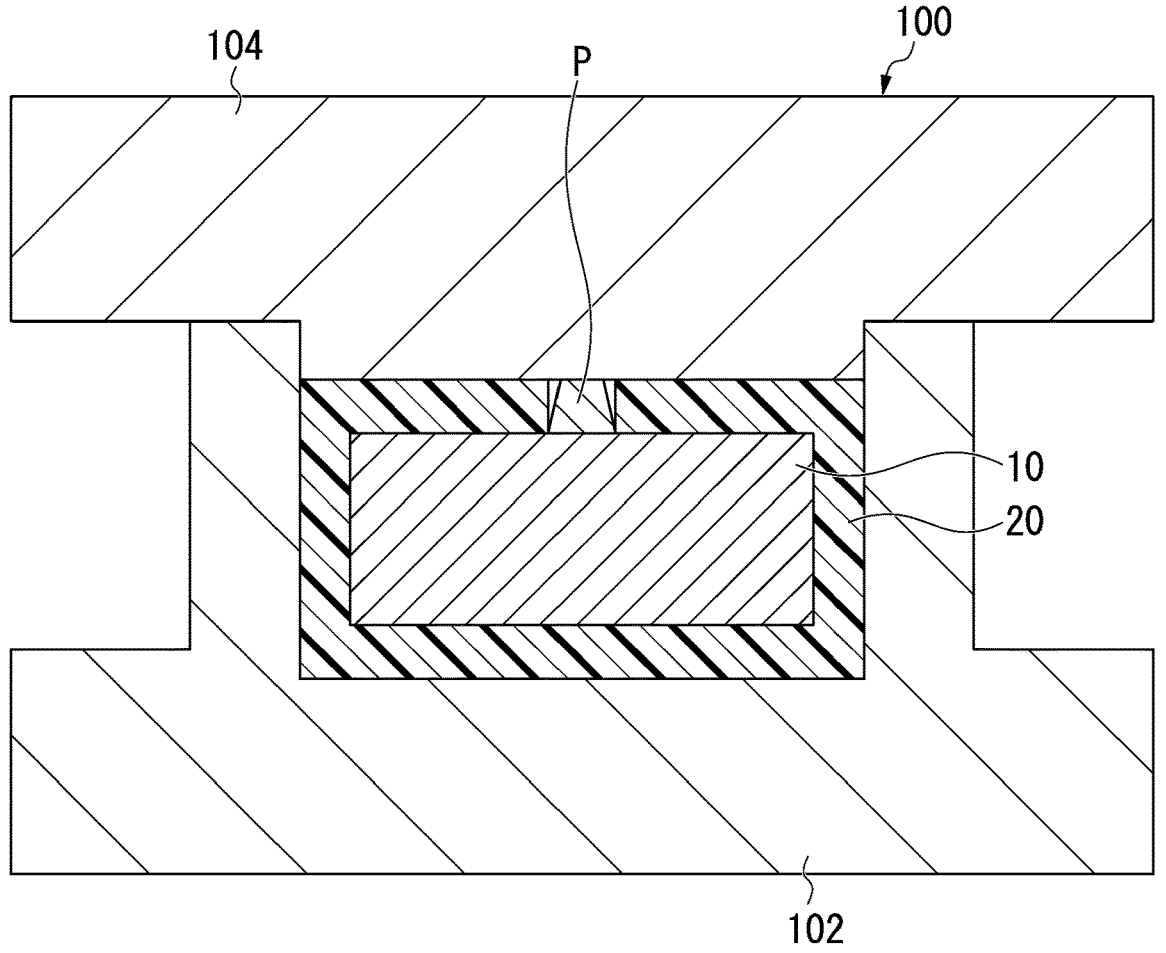
FIG. 7 is a cross-sectional view showing a state where a prepreg preform is put into a metal mold together with a fusible core.

FIG. 7 shows a state where the prepreg preform 20 shown in FIG. 6 has been put into a press mold 100 having a lower mold 102 and an upper mold 104.

Since the press mold 100 is held at the molding temperature in advance, a rise of the temperature of the fusible core 10 and the expansion associated with the rise of the temperature start immediately after the fusible core 10 is put into the press mold 100 together with the prepreg preform 20. In this case, it is not essential that the wax material is softened or fused in the fusible core 10.

The expansion of the fusible core 10 presses the prepreg preform 20 against the inner surface of the press mold 100. In other words, the fusible core 10 attempts to expand against the mold clamping force, whereby the pressure generated in the press mold 100 is applied to the prepreg preform 20.

The higher the pressure is, the fewer voids the FRP formed by the curing of the prepreg has.

Figure 8:
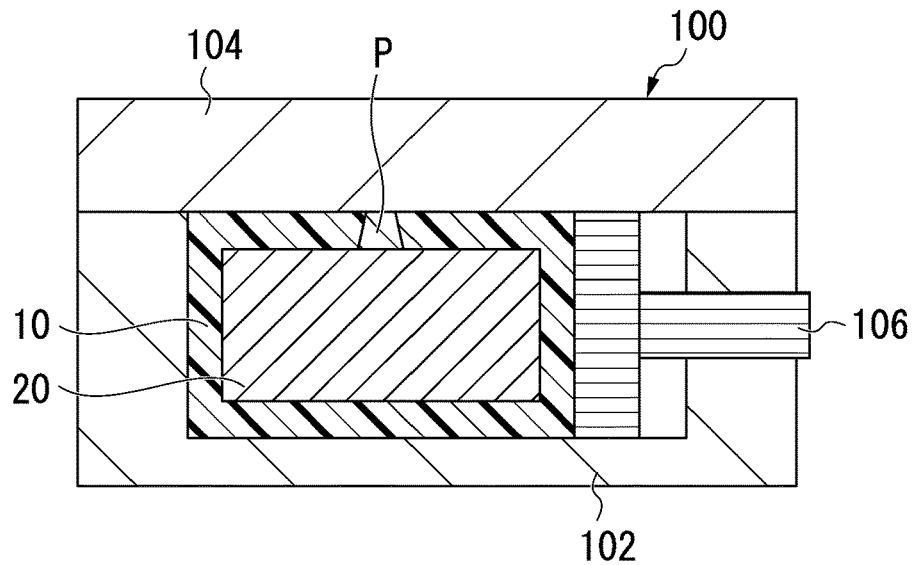
FIG. 8 is a cross-sectional view showing a state where a prepreg preform is put into a metal mold together with a fusible core.

In an example, as shown in FIG. 8, the press mold 100 to be used in the molding step may include a cavity formed by the lower mold 102, the upper mold 104, and a slide core 106.

The movement of the slide core 106 is controlled by a pressure control mechanism (not shown in the drawing) using hydraulic pressure or the like, and the slide core 106 does not move until the pressure in the metal mold reaches a predetermined value even when the fusible core 10 expands. When the pressure in the press mold 100 is about to exceed a predetermined value, the slide core 106 moves in the horizontal direction to relieve the pressure. It is convenient to control the molding pressure to be within a certain range by using such a press mold, in terms of stabilizing the quality of the FRP article.

Here, the wax material will be described as follows.

Since the wax material expands significantly in a case of being softened or fused, it is preferable to soften or fuse the wax material in the molding step when a high pressure is desired to be applied to the prepreg preform. In this case, it is required that the expansion associated with the softening of the wax material starts before the plasticity of the prepreg preform is lost due to the progression of curing.

One means for accelerating the softening of the wax material is to decrease the softening temperature.

Another means for accelerating the softening of the wax material is to bring the temperature of the fusible core close to the softening temperature of the wax material in advance by carrying out preheating before being put into the press mold. In a case of preheating the fusible core, the prepreg preform may be put into the oven as it is.

These two means can be adopted at the same time.

It is preferable that it takes a long time from the start of softening of the wax material to the fusion of the wax material to a liquid having high fluidity. When this time is sufficiently long, the prepreg preform is cured before the wax material fuses, and thus the fused wax material does not flow into the gap between the prepreg preform and the press mold.

A wax that is preferably blended with the wax material is a polyolefin wax from the viewpoint that the time from softening to fusion is long. Typical examples of the polyolefin wax include a polyethylene wax and a polypropylene wax. Suitable examples of the polyolefin wax include a thermal decomposition type polyethylene wax which is a thermal decomposition product of a polyethylene resin and a thermal decomposition type polypropylene wax which is a thermal decomposition product of a polypropylene resin.

In an example, it is possible to provide, in the fusible core, a first portion comprising a first wax material having a melting point lower than the molding temperature, and a second portion comprising a second wax material which is incompatible with the first wax material and has a melting point higher than the molding temperature. In a case of adjusting the volume ratio of the first portion that softens and expands in the press mold to the second portion that does not soften in the press mold, it is possible to control the pressure generated in the press mold.

When the polyolefin wax is blended into the first wax material, the second wax material is preferably blended with a wax comprising an organic compound having a polar group. This is due to the reason that a wax comprising a hydrocarbon as a main component and a wax comprising an organic compound having a polar group are often incompatible with each other.

The polar group is a functional group (excluding an ether group) having a carbon-oxygen bond or a carbon-nitrogen bond, such as a hydroxyl group, an amino group, an amide group, a carbonyl group, a carboxyl group, or an ester group.

Typical examples of the wax comprising an organic compound having a polar group include a wax comprising one or more organic compounds selected from a hydroxy fatty acid amide, a fatty acid amide, a hydroxy fatty acid ester, and a fatty acid ester.

1.2. Core Removal Step

The core removal step (ii) is a step of removing the core used in the molding step from the cured product obtained in the molding step.

Figure 9:
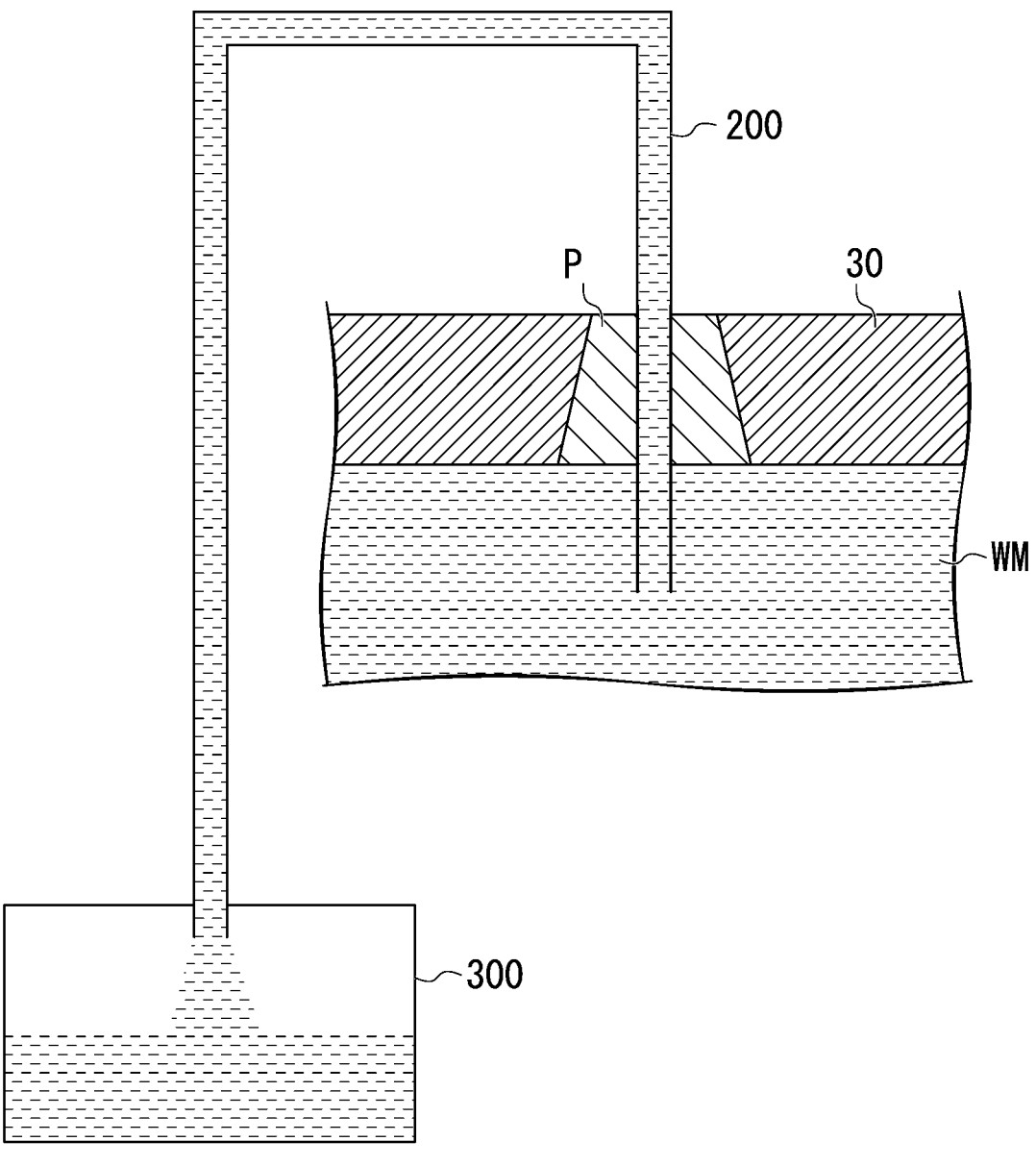
FIG. 9 shows a state where one end of a metal tube is plunged into an elastomer stopper to be penetrated through the elastomer stopper, and a wax is discharged through the metal tube into a collection container from an inside of a cavity of the hollow structure part in the fiber-reinforced resin article.

In a case where the pressure in the cavity remains high even after the molding step is completed and the press mold is open, the hollow structure part of the cured product is likely expanding and deforming. In order to prevent this, it is preferable that immediately after the upper mold is lifted, one end of a metal tube 200 is plunged into the elastomer stopper P to be penetrated through the elastomer stopper as shown in FIG. 9, and then the pressure in the cavity is reduced.

In a case where the other end of the metal tube 200 is connected to a collection container 300, the internal pressure of the cavity can be safely reduced.

As a modification example, an insertion hole for passing the metal tube 200 may be provided in the press mold 100, and the metal tube 200 may be plunged into a cured product 30 in the press mold 100 through this insertion hole before the upper mold 100 is lifted, thereby reducing the pressure in the cavity. In this modification aspect, the timing at which the metal tube 200 is plunged may be after the mold opening or may be before the mold opening.

For discharging the entire wax material from the inside of the cavity of the hollow structure part of the cured product, for example, the FRP article may be heated in an oven to completely fuse the fusible core in the hollow structure part.

When the wax material is discharged through the metal tube 200, it is preferable to heat at least a part of the metal tube so that the wax does not solidify in the metal tube.

For shortening the time required for discharging the wax material, a plurality of through holes may be provided in the hollow structure part of the cured product, and while air is allowed to flow into the cavity through a part of the through holes, the wax may be allowed to flow out of the cavity through other through holes. The through hole may be provided by using a drill or a hole saw after the molding step.

Figure 10:
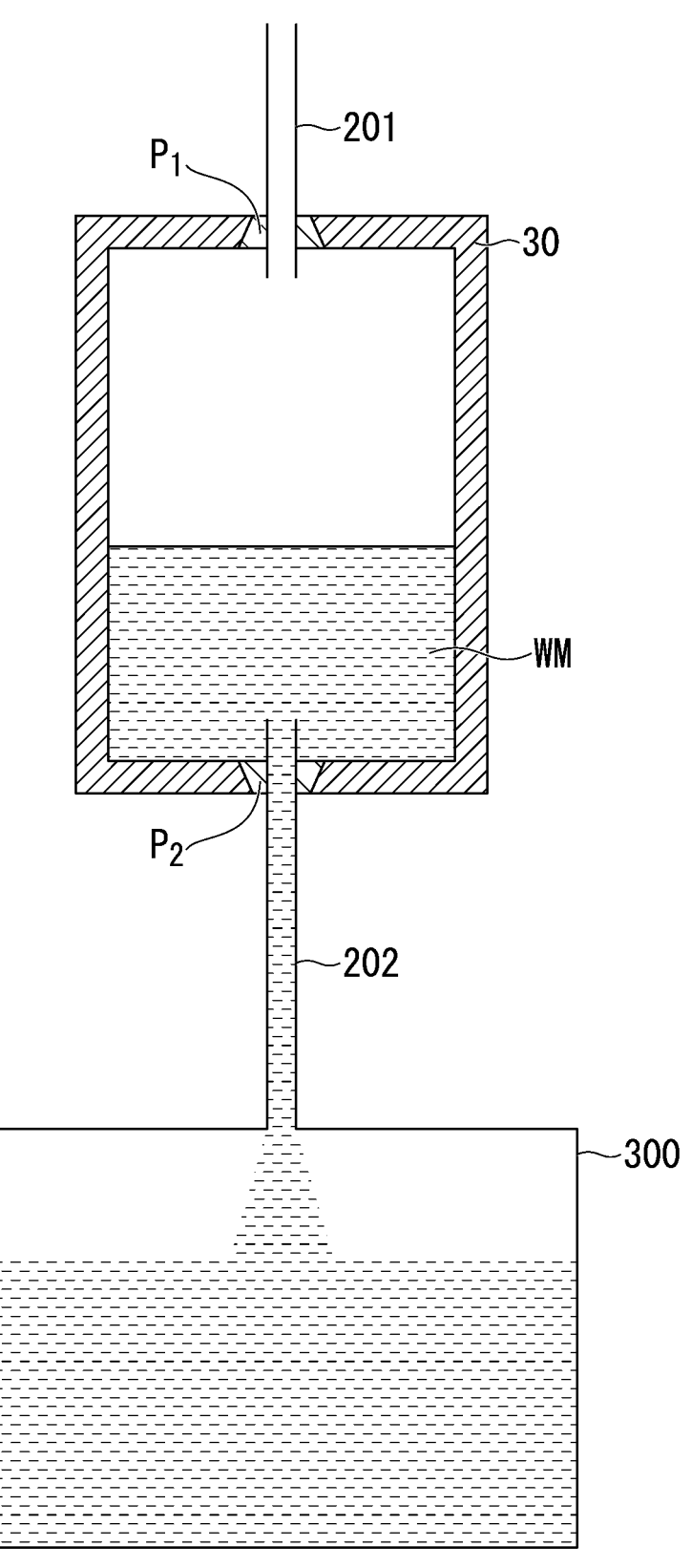
FIG. 10 shows a state where while allowing air to flow into a cavity of the hollow structure part in the fiber-reinforced resin article, through a metal tube that penetrates one elastomer stopper, a wax is discharged into a collection container from the inside of the cavity, through another metal tube that penetrates the other elastomer stopper.

In an example, as shown in FIG. 10, while allowing air to flow into the cavity through the metal tube 201 plunged into the elastomer stopper $P_1$ that closes a through hole provided in the hollow structure part of the cured product 30, the wax in the cavity can be discharged through a metal tube 202 plunged into an elastomer stopper $P_2$ that closes another through hole. Each of the number of through holes closed by the elastomer stopper $P_1$ and the number of through holes closed by the elastomer stopper $P_2$ is not limited to one and may be two or more.

An end of the metal tube 201, which is not inserted into the cavity, is open to atmospheric air. However, when air flows into the cavity through the metal tube 201, a pressure loss occurs, and thus the pressure in the cavity can be reduced to be lower than atmospheric pressure. In order to reduce this pressure loss, it is preferable that the metal tube 201 is as short as possible, and it is preferable that the inner diameter thereof is preferably as large as possible.

The example shown in FIG. 10 may be modified so that a pressurized gas is allowed to flow into the cavity through the metal tube 201. For example, an end of the metal tube 201, which is not inserted into the cavity, is connected to a compressor, whereby pressurized air can be sent into the cavity. Alternatively, it is connected to a gas cylinder instead of the compressor, whereby a pressurized inert gas (for example, a nitrogen gas) can be sent into the cavity.

In an aspect in which a gas is allowed to flow into the cavity by using the metal tube 201, it is not essential to use the metal tube 202 for discharging the wax, and the wax may be discharged from the cavity through a through hole formed in the cured product after the molding step.

1.3. Various Embodiments

As necessary, various additives can be added to the fusible core that is used in the method for producing an FRP article according to the embodiment.

In an example, the fusible core is capable of being subjected to induction heating by adding particles of a material having a property of generating heat in a high-frequency electromagnetic field. Examples of such a material include a ferromagnetic material, a ferrimagnetic material, and a conductive material. Examples of the ferromagnetic material include iron, nickel, cobalt, an iron alloy, a nickel alloy, a cobalt alloy, a permalloy, and many steels. Examples of the ferrimagnetic material include magnetite, nickel-zinc ferrite, manganese-zinc ferrite, and copper-zinc ferrite. Examples of the conductive material include copper, aluminum, and brass.

In another example, the fusible core is capable of being subjected to microwave heating by adding particles of a material having a property of absorbing microwaves to generate heat. Examples of such a material include silicon carbide, ferrite, barium titanate, anatase-type titanium oxide, graphite, and carbon black.

The induction heating or microwave heating of the fusible core can be preferably carried out when the fusible core is preheated outside the press mold.

When the first portion and the second portion are provided in the fusible core, a coloring agent such as a pigment or a dye can be used to make the first portion and the second portion visually distinguished by a difference in color thereof. The coloring agent may be added to any one of the first portion and the second portion or may be added to both.

By making the colors of the first portion and the second portion different from each other, it is possible to prevent the first portion and the second portion from being wrongly disposed, for example, in a case where the fusible core is assembled.

Also, in an operation of fusing the first portion and the second portion to separate the first wax material and the second wax material after the core removal step, it is convenient that the colors of the first portion and the second portion are different from each other.

Figure 11:
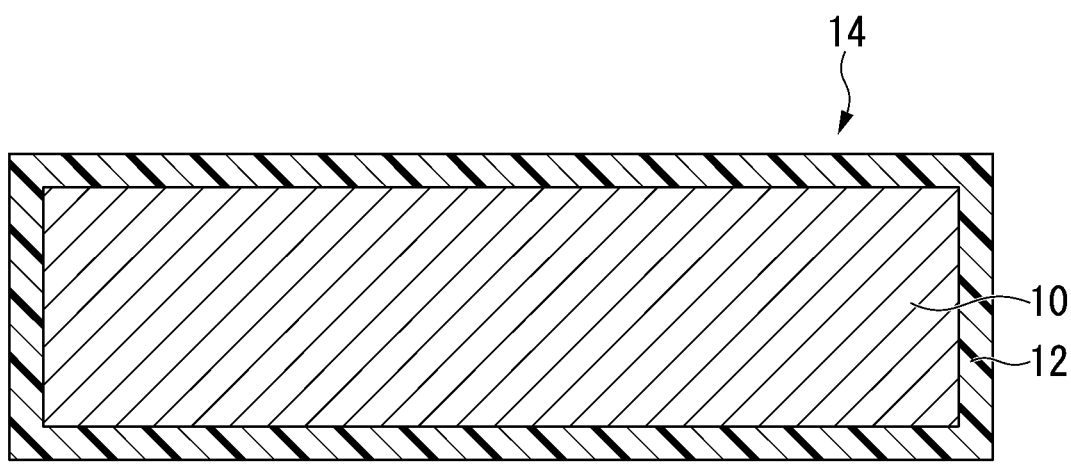
FIG. 11 is a cross-sectional view showing a structure of a partially fusible core.

In an aspect in which the wax material is fused in at least a part of the fusible core in the molding step, a partially fusible core may be used instead of the fusible core. As exemplarily shown in the cross-sectional view in FIG. 11, a partially fusible core 14 comprises the fusible core (fusible part) 10 comprising a wax material, and an outer skin 12 covering the fusible core. When the wax material is fused in the fusible core (fusible part), the outer skin prevents the fused wax material from entering the gap between prepreg preform and the press mold.

The material of the outer skin 12 of the partially fusible core 14 must be capable of undergoing extensional deformation at the molding temperature so that the outer skin 12 does not break when the fusible core (fusible part) 10 is deformed or expanded in the molding step. This extensional deformation may be elastic, may be plastic, or may have both properties.

As a result, the preferred material of the outer skin 12 is not limited to; however, it is an organic material and particularly, a resin material. Examples of the preferred material of the outer skin include synthetic polymers such as polyolefin, polyamide, polyester, polyurethane, silicone, and fluororubber, and further include elastomers comprising these polymers.

When the partially fusible core 14 is produced, for example, the fusible core (fusible part) 10 is wrapped with a polymer film prepared for the outer skin 12 and sealed by adhesion or fusion.

The outer skin 12 can also be formed by using a shrink tube comprising the above-described polymer. A shrink tube in which the fusible core (fusible part) has been put in may be subjected to thermal shrinkage, and further, both ends of the shrink tube may be subjected to heat sealing.

The outer skin 12 can also be formed by using a low-temperature curable liquid rubber comprising the above-described polymer. A liquid rubber may be applied onto the surface of the fusible core (fusible part) 10 and cured at a temperature at which the wax does not fuse.

The outer skin 12 can also be formed from a UV-curable elastomer. A UV-curable elastomer is a UV-curable resin of which the cured product is an elastic body such as rubber, and an example thereof is a UV-curable silicone rubber or a UV-curable urethane acrylate. The UV-curable elastomer is suitable as the material of the outer skin, from the viewpoint that the UV-curable elastomer can be cured in a short period of time even at room temperature.

1.4. Scope of Application

The method for producing an FRP article according to the embodiment can also be applied when an FRP article having a large size is produced from two or more partial prepreg preforms.

In the FRP article produced by the method for producing an FRP article according to the embodiment, the FRP may be molded so that a composite body is formed with a component comprising a material other than the FRP, such as metal.

2. FRP Article

Another embodiment according to the present invention is an FRP article produced by the method for producing an FRP article according to the embodiment, which has been described in section 1 with reference to the specific example.

Figure 2:
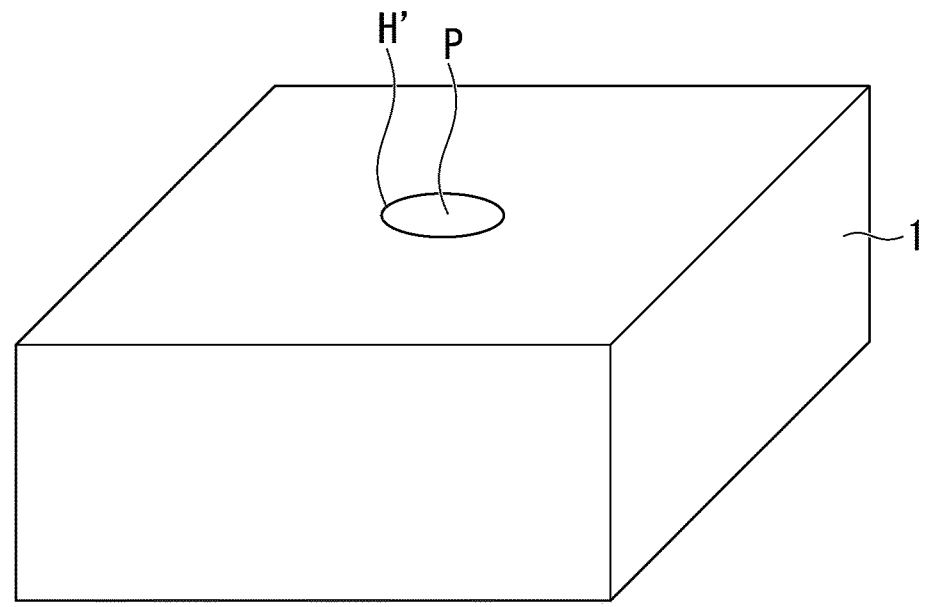
FIG. 2 is a perspective view schematically showing a fiber-reinforced resin article.
Figure 3:
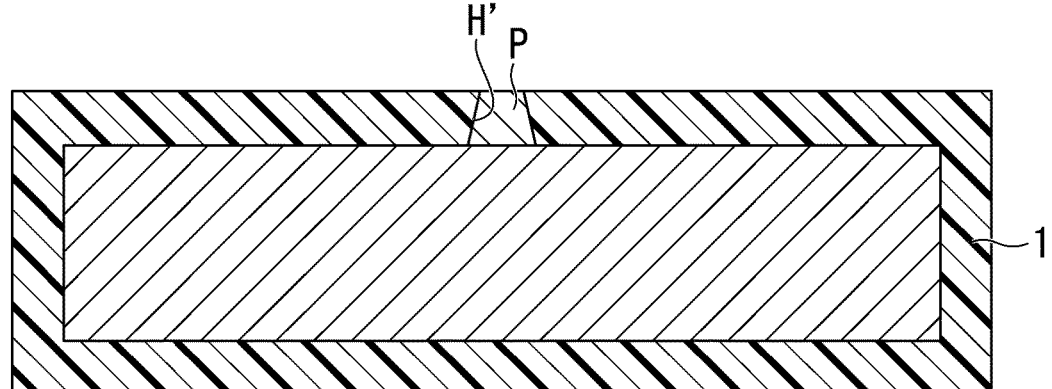
FIG. 3 is a cross-sectional view schematically showing a fiber-reinforced resin article.

A hollow FRP article 1 shown in FIG. 2 comprises one hollow structure part as a whole, and the inside thereof is a cavity as shown in FIG. 3. The FRP article 1 has a through hole H' that leads to the outside from the inner space of the cavity, and the through hole H' is closed by the elastomer stopper P, where such a structure is derived from the fact that the FRP article 1 is produced by the production method according to the embodiment.

In the FRP article 1, the entire elastomer stopper P is tapered in a direction outward from the inner space of the cavity. In an example, the elastomer stopper P may have a protrusion or a depression on the side surface instead of being tapered or in addition to being tapered.

3. Summary of Embodiments

Embodiments according to the present invention include the following embodiments, but are not limited thereto.

[Embodiment 1] A method for producing a fiber-reinforced plastic, the production method comprising:
  a molding step of disposing, in a press mold, a prepreg preform including a core-containing part in which a fusible core comprising a wax material is disposed in an inner side, and heating the disposed prepreg preform to obtain a cured product having a hollow structure part; and
  a core removal step of removing the fusible core from the cured product,
  wherein in the prepreg preform, a through hole is formed in the core-containing part, and an elastomer stopper is inserted into the through hole.

[Embodiment 2] The production method according to Embodiment 1,
  wherein at least a part of the elastomer stopper is tapered, and a side of the elastomer stopper, which is larger in terms of an area of a cross section orthogonal to an insertion direction, is inserted into the through hole to be directed toward the fusible core.

10

[Embodiment 3] The production method according to Embodiment 1 or 2,
  wherein the elastomer stopper has a protrusion or a depression on a side surface.

[Embodiment 4] The production method according to any one of Embodiments 1 to 3,
  wherein in the core removal step, one end of a metal tube is plunged into the elastomer stopper to be penetrated through the elastomer stopper, and from an inside of a cavity formed in the hollow structure part of the cured product, a whole or part of the wax material is discharged through the metal tube.

[Embodiment 5] The production method according to Embodiment 4,
  wherein in the core removal step, at least a part of the metal tube is heated.

[Embodiment 6] The production method according to Embodiment 4 or 5,
  wherein the other end of the metal tube is connected to a collection container.

[Embodiment 7] The production method according to any one of Embodiments 1 to 3,
  wherein in the core removal step, one end of a metal tube is plunged into the elastomer stopper to be penetrated through the elastomer stopper, and a gas is allowed to flow through the metal tube into an inside of a cavity formed in the hollow structure part of the cured product.

[Embodiment 8] The production method according to Embodiment 7,
  wherein the other end of the metal tube is open to atmospheric air.

[Embodiment 9] The production method according to Embodiment 7,
  wherein the gas is pressurized.

[Embodiment 10] The production method according to any one of Embodiments 1 to 9,
  wherein in the molding step, the wax material is softened in at least a part of the fusible core.

[Embodiment 11] The production method according to any one of Embodiments 1 to 10,
  wherein in the molding step, the wax material is fused in at least a part of the fusible core.

[Embodiment 12] The production method according to Embodiment 10 or 11,
  wherein the fusible core has a first portion comprising a first wax material and a second portion comprising a second wax material that is incompatible with the first wax material, and
  the second wax material is not softened in the molding step.

[Embodiment 13] The production method according to Embodiment 12,
  wherein any one of the first wax material and the second wax material comprises a hydrocarbon as a main component, and the other thereof comprises an organic compound having a polar group.

[Embodiment 14] The production method according to any one of Embodiments 1 to 13,
  wherein the fusible core comprises particles of a material having a property of generating heat in a high-frequency electromagnetic field.

[Embodiment 15] The production method according to any one of Embodiments 1 to 13,
  wherein the fusible core comprises particles of a material having a property of absorbing a microwave to generate heat.

[Embodiment 16] The production method according to any one of Embodiments 1 to 15, wherein the fusible core is preheated before the molding step.

[Embodiment 17] The production method according to any one of Embodiments 1 to 16, wherein in the prepreg preform, the fusible core is disposed in the inner side of the core-containing part without being covered with an outer skin.

[Embodiment 18] A method for producing a fiber-reinforced plastic, the production method comprising:

a molding step of disposing, in a press mold, a prepreg preform including a core-containing part in which a fusible core comprising a wax material is disposed in an inner side, and heating the disposed prepreg preform to obtain a cured product having a hollow structure part; and a core removal step of removing the fusible core from the cured product, wherein in the core-containing part, a first through hole and a second through hole are formed in the prepreg preform, a first elastomer stopper is inserted into the first through hole, and a second elastomer stopper is inserted into the second through hole.

[Embodiment 19] The production method according to Embodiment 18, wherein at least a part of each of the first elastomer stopper and the second elastomer stopper is tapered, and a side of each of the first elastomer stopper and the second elastomer stopper, which is larger in terms of an area of a cross section orthogonal to an insertion direction, is inserted into the through hole to be directed toward the fusible core.

[Embodiment 20] The production method according to Embodiment 18 or 19, wherein each of the first elastomer stopper and the second elastomer stopper has a protrusion or a depression on a side surface.

[Embodiment 21] The production method according to any one of Embodiments 18 to 20, wherein in the core removal step, one end of a first metal tube is plunged into the first elastomer stopper to be penetrated through the elastomer stopper, one end of a second metal tube is concurrently plunged into the second elastomer stopper to be penetrated through the elastomer stopper, and a whole or part of the wax material is discharged through the second metal tube from the inside of the cavity, while allowing a gas to flow through the first metal tube into an inside of a cavity formed in the hollow structure part of the cured product.

[Embodiment 22] The production method according to Embodiment 21, wherein in the core removal step, at least a part of the second metal tube is heated.

[Embodiment 23] The production method according to Embodiment 21 or 22, wherein the other end of the second metal tube is connected to a collection container.

[Embodiment 24] The production method according to any one of Embodiments 21 to 23, wherein the other end of the first metal tube is open to atmospheric air.

[Embodiment 25] The production method according to any one of Embodiments 21 to 23, wherein the gas is pressurized.

[Embodiment 26] The production method according to any one of Embodiments 18 to 25, wherein in the molding step, the wax material is softened in at least a part of the fusible core.

[Embodiment 27] The production method according to any one of Embodiments 18 to 26, wherein in the molding step, the wax material is fused in at least a part of the fusible core.

[Embodiment 28] The production method according to Embodiment 26 or 27, wherein the fusible core has a first portion comprising a first wax material and a second portion comprising a second wax material that is incompatible with the first wax material, and the second wax material is not softened in the molding step.

[Embodiment 29] The production method according to Embodiment 28, wherein any one of the first wax material and the second wax material comprises a hydrocarbon as a main component, and the other thereof comprises an organic compound having a polar group.

[Embodiment 30] The production method according to any one of Embodiments 18 to 29, wherein the fusible core comprises particles of a material having a property of generating heat in a high-frequency electromagnetic field.

[Embodiment 31] The production method according to any one of Embodiments 18 to 29, wherein the fusible core comprises particles of a material having a property of absorbing a microwave to generate heat.

[Embodiment 32] The production method according to any one of Embodiments 18 to 31, wherein the fusible core is preheated before the molding step.

[Embodiment 33] The production method according to any one of Embodiments 18 to 32, wherein in the prepreg preform, the fusible core is disposed in the inner side of the core-containing part without being covered with an outer skin.

[Embodiment 34] A fiber-reinforced resin article comprising:

a hollow structure part;

a cavity formed in the hollow structure part;

a through hole that leads to an outside from an inner space of the cavity; and an elastomer stopper that closes the through hole.

[Embodiment 35] The fiber-reinforced resin article according to Embodiment 34, wherein at least a part of the elastomer stopper is tapered in a direction toward the outside from the inner space of the cavity.

[Embodiment 36] The fiber-reinforced resin article according to Embodiment 34 or 35, wherein the elastomer stopper has a protrusion or a depression on a side surface.

4. Experimental Results

A hollow rectangular parallelepiped comprising an FRP and having a size of 72 mm×36 mm×20 mm was experimentally prepared by the following procedure.

One sheet of an SMC (STR120N131 manufactured by Mitsubishi Chemical Corporation) having a thickness of 2 mm was cut into a predetermined shape, while at the same time, a cylindrical through hole having an inner diameter of 6 mm was formed in a portion of the SMC, and then the SMC was folded, and thereby a prepreg preform having a near net shape was prepared.

When the prepreg preform was prepared, a partially fusible core prepared in another step was disposed inside the prepreg preform.

The partially fusible core was prepared with a fusible part (fusible core) comprising a synthetic wax (ITOHWAX E-70G manufactured by Itoh Oil Chemicals Co., Ltd.) comprising a higher fatty acid ester and having a melting point of 68° C., which had been covered with an outer skin formed by using a nylon 6 film having a thickness of 7 m, so that the partially fusible core had a rectangular parallelepiped shape having a size that is just fitted into the prepreg preform.

A silicone rubber stopper was inserted into the through hole provided in the SMC. This silicone rubber stopper was a conical trapezoidal tapered stopper having a diameter of 6 mm at the upper bottom surface, a diameter of 10 mm at the lower bottom surface, and a height of 4 mm, and was inserted into the through hole so that the lower bottom surface faced the core.

The prepreg preform was placed, together with the core wrapped on the inner side of the prepreg preform, in a mold that had been heated in advance to the same temperature as the molding temperature so that the surface having the through hole faced upward, and the prepreg preform was heated and pressurized to be cured. The molding temperature was set to 140° C., and the molding time was set to 10 minutes. After the molding was completed, immediately after the upper mold was lifted, one end of a stainless-steel tube having an outer diameter of 2 mm and an inner diameter of 1 mm was plunged into a silicone rubber stopper, fused wax flowed through the stainless-steel tube from the inside of the molded article into a container connected to the other end of the stainless-steel tube.

The present invention has been described above in line with the specific embodiments; however, each of the embodiments has been suggested as an example and thus is not intended to limit the scope of the present invention. Each of the embodiments described in the present specification can be variously modified to the extent that the gist of the invention is maintained and can be combined with the features described by other embodiments, to the extent practicable.

INDUSTRIAL APPLICABILITY

The invention disclosed in the present specification can be preferably used, without any limitations, in a case where components (including structural components) for automobiles, ships, railway vehicles, aircraft, and other transportation equipment, as well as various sports goods including bicycle frames, tennis rackets, and golf shafts are manufactured with fiber-reinforced plastics.

REFERENCE SIGNS LIST

1: Fiber-reinforced resin article
10: Fusible core
12: Outer skin
14: Partially fusible core
20: Prepreg preform
30: Cured product
100: Press mold
102: Lower mold
104: Upper mold 106: Slide core
200, 201, 202: Metal tube
300: Collection container
H, H': Through hole
P, $P_1$, $P_2$: Elastomer stopper
WM: Wax material

What is claimed is:

1. A method for producing a fiber-reinforced plastic, the production method comprising:
    providing a fusible core comprising a wax material,
    disposing prepreg with a hole around the fusible core to form a prepreg preform with a through hole,
    inserting an elastomer stopper in the through hole,
    disposing in a press mold the prepreg preform containing the fusible core with the elastomer stopper in the through hole,
    molding and heating the disposed prepreg preform to obtain a cured product containing the fusible core,
    a core removal step of removing the fusible core from the cured product.

2. The production method according to claim 1, wherein at least a part of the elastomer stopper is tapered, and a side of the elastomer stopper, which is larger in terms of an area of a cross section orthogonal to an insertion direction, is inserted into the through hole to be directed toward the fusible core.

3. The production method according to claim 1, wherein the elastomer stopper has a protrusion or a depression on a side surface.

4. The production method according to claim 1, wherein in the core removal step, one end of a metal tube is plunged into the elastomer stopper to be penetrated through the elastomer stopper, and from an inside of a cavity formed in the hollow structure part of the cured product, a whole or part of the wax material is discharged through the metal tube.

5. The production method according to claim 4, wherein in the core removal step, at least a part of the metal tube is heated.

6. The production method according to claim 4, wherein the other end of the metal tube is connected to a collection container.

7. The production method according to claim 1, wherein in the core removal step, one end of a metal tube is plunged into the elastomer stopper to be penetrated through the elastomer stopper, and a gas is allowed to flow through the metal tube into an inside of a cavity formed in the hollow structure part of the cured product.

8. The production method according to claim 7, wherein the other end of the metal tube is open to atmospheric air.

9. The production method according to claim 7, wherein the gas is pressurized.

10. The production method according to claim 1, wherein in the molding step, the wax material is softened in at least a part of the fusible core.

11. The production method according to claim 1, wherein in the molding step, the wax material is fused in at least a part of the fusible core.

12. The production method according to claim 10, wherein the fusible core has a first portion comprising a first wax material and a second portion comprising a second wax material that is incompatible with the first wax material, and the second wax material is not softened in the molding step.

13. The production method according to claim 12,
wherein any one of the first wax material and the second
wax material comprises a hydrocarbon as a main com-
ponent, and the other thereof comprises an organic
compound having a polar group.

14. The production method according to claim 1,
wherein the fusible core comprises particles of a material
having a property of generating heat in a high-fre-
quency electromagnetic field.

15. The production method according to claim 1,
wherein the fusible core comprises particles of a material
having a property of absorbing a microwave to generate
heat.

16. The production method according to claim 1,
wherein the fusible core is preheated before the molding
step.

17. The production method according to claim 1,
wherein in the prepreg preform, the fusible core is dis-
posed in the inner side of the core-containing part
without being covered with an outer skin.

18. A method for producing a fiber-reinforced plastic, the
production method comprising:
providing a fusible core comprising a wax material,
disposing prepreg with a first hole and a second hole
around the fusible core to form a prepreg preform with
a first through hole and a second through hole,
inserting a first elastomer stopper in the first through hole
and a second elastomer stopper in the second through
hole,
disposing in a press mold the prepreg preform containing
the fusible core with the first elastomer stopper in the
first through hole and the second elastomer stopper in
the second through hole,
molding and heating the disposed prepreg preform to
obtain a cured product containing the fusible core,
a core removal step of removing the fusible core from the
cured product.

19. The production method according to claim 18,
wherein at least a part of each of the first elastomer
stopper and the second elastomer stopper is tapered,
and a side of each of the first elastomer stopper and the
second elastomer stopper, which is larger in terms of an
area of a cross section orthogonal to an insert ion
direction, is inserted into the through hole to be directed
toward the fusible core.

20. The production method according to claim 18,
wherein each of the first elastomer stopper and the second
elastomer stopper has a protrusion or a depression on a
side surface.

21. The production method according to claim 18,
wherein in the core removal step, one end of a first metal
tube is plunged into the first elastomer stopper to be
penetrated through the elastomer stopper, one end of a second metal tube is concurrently plunged into the
second elastomer stopper to be penetrated through the
elastomer stopper, and a whole or part of the wax
material is discharged through the second metal tube
from the inside of the cavity, while allowing a gas to
flow through the first metal tube into an inside of a
cavity formed in the hollow structure part of the cured
product.

22. The production method according to claim 21,
wherein in the core removal step, at least a part of the
second metal tube is heated.

23. The production method according to claim 21,
wherein the other end of the second metal tube is con-
nected to a collection container.

24. The production method according to claim 21,
wherein the other end of the first metal tube is open to
atmospheric air.

25. The production method according to claim 21,
wherein the gas is pressurized.

26. The production method according to claim 18,
wherein in the molding step, the wax material is softened
in at least a part of the fusible core.

27. The production method according to claim 18,
wherein in the molding step, the wax material is fused in
at least a part of the fusible core.

28. The production method according to claim 26,
wherein the fusible core has a first portion comprising a
first wax material and a second portion comprising a
second wax material that is incompatible with the first
wax material, and
the second wax material is not softened in the molding
step.

29. The production method according to claim 28,
wherein any one of the first wax material and the second
wax material comprises a hydrocarbon as a main com-
ponent, and the other thereof comprises an organic
compound having a polar group.

30. The production method according to claim 18,
wherein the fusible core comprises particles of a material
having a property of generating heat in a high-fre-
quency electromagnetic field.

31. The production method according to claim 18,
wherein the fusible core comprises particles of a material
having a property of absorbing a microwave to generate
heat.

32. The production method according to claim 18,
wherein the fusible core is preheated before the molding
step.

33. The production method according to claim 18,
wherein in the prepreg preform, the fusible core is dis-
posed in the inner side of the core-containing part
without being covered with an outer skin.

* * * * *